United States Patent [19]

Kemp et al.

[11] Patent Number: 5,392,302
[45] Date of Patent: Feb. 21, 1995

[54] ADDRESS ERROR DETECTION TECHNIQUE FOR INCREASING THE RELIABILITY OF A STORAGE SUBSYSTEM

[75] Inventors: Paul W. Kemp, Northborough; Anh T. Tran, Shrewsbury, both of Mass.

[73] Assignee: Quantum Corp., Milpitas, Calif.

[21] Appl. No.: 163,397

[22] Filed: Dec. 6, 1993

Related U.S. Application Data

[63] Continuation of Ser. No. 668,917, Mar. 13, 1991, abandoned.

[51] Int. Cl.6 .................... G06F 11/10; H03M 13/00
[52] U.S. Cl. ................................................ 371/51.1
[58] Field of Search ............................. 371/51.1, 49.1

[56] References Cited

U.S. PATENT DOCUMENTS

| | | | |
|---|---|---|---|
| 3,221,310 | 11/1965 | Reach | 371/51.1 X |
| 3,270,318 | 8/1966 | Strawbridge | 371/51.1 |
| 3,585,378 | 5/1971 | Bouricius | 371/51.1 |
| 3,599,146 | 8/1971 | Weisbecker | 371/51.1 |
| 3,789,204 | 1/1974 | Barlow | 371/51.1 |
| 3,810,577 | 5/1974 | Drescher | 371/51.1 X |
| 3,914,741 | 11/1975 | Bonser | 371/51.1 |
| 4,019,033 | 4/1977 | Parmet | 371/51.1 |
| 4,084,236 | 4/1978 | Chelberg | 364/200 |
| 4,271,521 | 6/1981 | Mahmood | 371/51 |
| 4,295,219 | 10/1981 | Draper et al. | 371/51 |
| 4,310,895 | 1/1982 | Edstrom et al. | 364/900 |
| 4,442,519 | 4/1984 | Jones et al. | 371/27 |
| 4,528,665 | 7/1985 | Burns et al. | 371/51 |
| 4,785,453 | 11/1988 | Chandran | 371/51.1 |
| 4,945,548 | 7/1990 | Iannarone et al. | 375/4 |
| 4,959,835 | 9/1990 | Yosida et al. | 371/51.1 |
| 5,048,022 | 9/1991 | Bissett | 371/68.3 X |
| 5,068,851 | 11/1991 | Bruckert | 371/16.1 |

FOREIGN PATENT DOCUMENTS

| | | | |
|---|---|---|---|
| 0030300 | 2/1984 | Japan | 371/51.1 |
| 1403527 | 8/1975 | United Kingdom | 371/51.1 |

OTHER PUBLICATIONS

IBM Technical Disclosure Bulletin, vol. 32, No. 3B; Aug. 1989; p. 44.

*Primary Examiner*—Robert W. Beausoliel, Jr.
*Assistant Examiner*—Glenn Snyder
*Attorney, Agent, or Firm*—David B. Harrison

[57] ABSTRACT

A fault detection arrangement provides error detection and verification of generated address sequences for the execution of read/write operations in a storage subsystem. The arrangement also prevents corruption of data stored on the subsystem array module. Gray code counters located in the address path of the array module generate sequential addresses and associated parity for words of a block of data, based on a starting address received from a storage controller. As each address is generated and transferred to storage devices of the array, a parity checker regenerates parity information associated with the transferred address and compares that parity information to the parity information received from the counters. If an address error is detected, execution of the read/write operation is suppressed and the controller is immediately notified of the error.

8 Claims, 5 Drawing Sheets

ADDRESS ERROR DETECTION TECHNIQUE FOR INCREASING THE RELIABILITY OF A STORAGE SUBSYSTEM

This application is a continuation of application Ser. No. 07/668,917, filed Mar. 13, 1991, now abandoned.

FIELD OF THE INVENTION

This invention relates generally to address fault detection and, more specifically, to a method and apparatus for increasing the reliability of data stored in a storage subsystem array of a digital computer system.

BACKGROUND OF THE INVENTION

A digital storage subsystem, such as a solid-state "disk drive" includes a storage controller and an array composed of dynamic random access memory (DRAM) devices. The controller is physically separated from the array so that individual DRAM-based array modules may use a common storage control function. In that way, the storage capacity of the subsystem may easily be increased or decreased as required.

The storage subsystem provides high transfer rates, i.e. block-mode transfers of data to and from a main memory, and fast access. A block-mode transfer involves the transmission of a plurality of data words to or from a predetermined number of addressed locations in the DRAM array. Typically, a starting binary address associated with the block of data is provided to the controller. The controller thereafter generates a predetermined number of sequential addresses, typically with the use of counters. The addresses are then transferred as signals to the appropriate memory array modules.

It is important that the transferred address signals be error-free to ensure reliable storage and retrieval of data to and from the DRAM locations. Accordingly, error detection codes are used to detect errors in the transfer of the address signals. A common address error detection code is the parity bit, which is an extra bit included with the address bits to make the total number of ones either odd or even. However, the use of such a code in connection with a binary counter requires extensive manipulation to determine parity since different numbers of bit positions are altered for successive addresses.

Gray code counters have been used in conjunction with parity code systems to provide cost-effective address error detection. The advantage of Gray code over straight binary numbers is that the Gray code changes by only one bit as it sequences from one number to the next. Gray code counters thus remove multiple-bit ambiguities during the change from one state of a counter to the next because only one bit changes during the state transition. Accordingly, easily-derived, one-bit parity checks can be used. Nevertheless, the mere detection of an address error is insufficient to ensure the integrity of data stored in the DRAM array. That is, the occurrence of an address error during a write operation may still result in data being stored at an erroneous address and corrupting the previously stored data at that location.

SUMMARY OF THE INVENTION

Briefly, a controller in accordance with the invention converts a binary address to a gray code address. The address identifies the starting location for a read/write operation of a block of data in a DRAM array. The controller also generates parity associated with the starting gray code address. The starting gray code address and associated parity bits are then transmitted to an array module.

Gray code counters located in the address path of the array module then generate sequential addresses and associated parity bits for individual words of the block of data. As each address is received by the array, a parity check circuit at the input of the array regenerates parity bits associated with the transferred address and compares those parity bits with the parity bits received from the counters. If an address error is detected, execution of the read/write operation is suppressed and the controller is immediately notified to reissue the read/write operation.

Since the generation of successive addresses for individual words is performed on the array module, the probability of transmission errors between the controller and array module is greatly reduced. The arrangement also provides for address sequence verification of the storage array input to detect faults in the address path of the array module. The use of a parity check circuit for address verification requires roughly half the pin count of an address comparison approach. This allows verification of addresses in a large array with a relatively small number of added components. In addition, suppression of a write operation having an erroneous address prevents the corruption of data at the erroneous address, thereby increasing the reliability of the storage subsystem.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
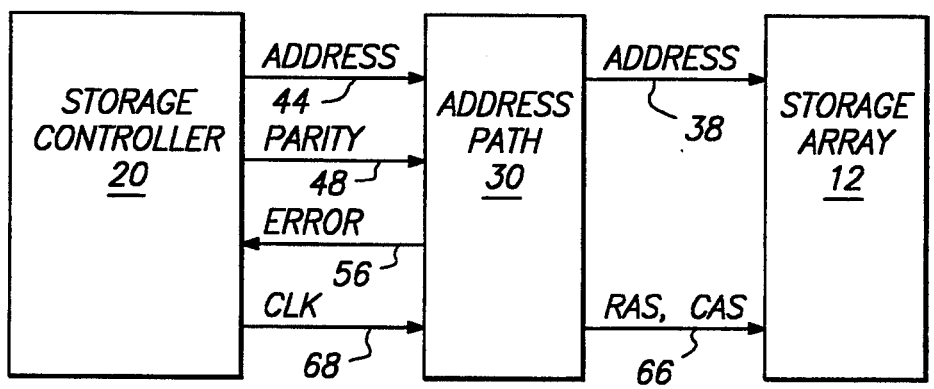
FIG. 1 is a diagram of a storage subsystem in which the address fault detection arrangement of this invention may be advantageously used.

Referring to FIG. 1, a storage subsystem 10 includes an address path 30 that couples a storage array 12 to a storage controller 20. The depicted elements relate to the memory addressing operations of the subsystem 10. The data transfer operations are provided by other elements not shown herein.

The storage controller 20 directs the operation of the storage subsystem 10 by providing a starting gray code address on line 44 and associated parity signals on line 48 for a block of data in array 12. In addition, the controller 20 provides a clock signal on line 68 for synchronizing the activites of the address path 30 and storage array 12 with the operation of the rest of the subsystem 10.

The address path 30 includes the logic necessary to access locations within the storage array 12 for each data word of the block. The storage array 12 comprises, for example, four hundred and eighty (480) 4 Mb×1 dynamic random access memory (DRAM) devices that provide approximately 214 MB of data storage. Conceptually, the DRAM locations are accessed by row and column addresses. To that end, the address path 30 provides a unique gray code address on line 38 for accessing individual words of the block on array 12, and the proper row address strobe (RAS) and column address strobe (CAS) signals on line 66 for loading memory addresses into the array 12. It is to be understood that lines 38 and 44, as well as others described herein, represent a series of individual wire connections, e.g. eleven, that are generally referred to herein as a single connection for convenience.

Figure 2:
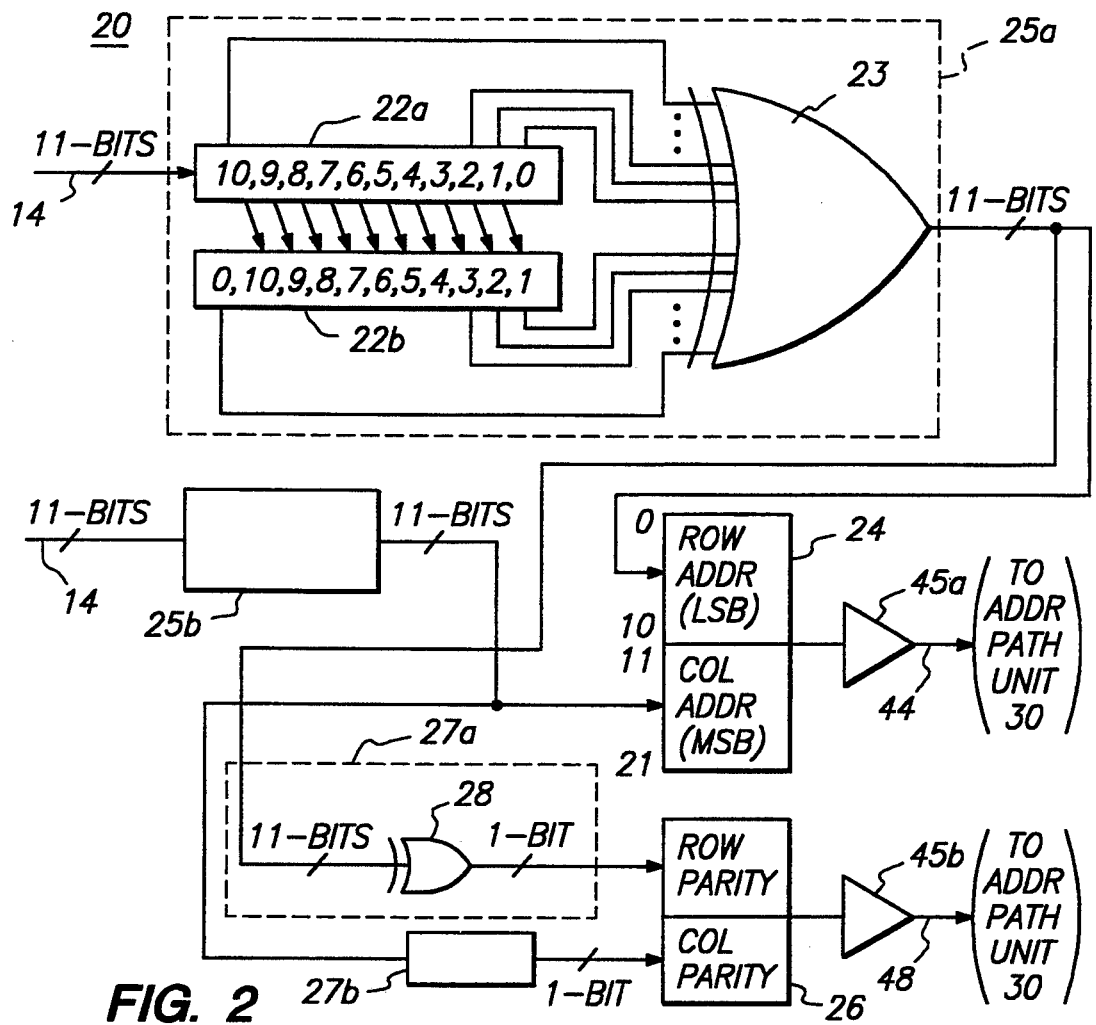
FIG. 2 is a diagram of portions of a storage controller used in the storage subsystem of FIG. 1.

FIG. 2 is a diagram of portions of the storage controller 20. In accordance with the invention, the storage controller 20 includes converters 25a,b for converting a starting binary address to a starting gray code address. A starting binary storage location consisting of a row address portion and a column address portion is loaded into converters 25a,b via an input address bus 14. Each address portion is converted into a "gray code" equivalent starting address via a shift and exclusive OR (XOR) hardware algorithm. The row and column addresses each preferably comprise 11-bits, for a total of twenty-two (22) bits of addressing capability.

Operationally, the starting binary row address is initially loaded into converter 25a. More specifically, the binary row address is loaded into a register 22a and then loaded in parallel into register 22b. The contents of bit positions 0–10 are shifted one (1) position to the right when loaded into register 22b. The contents of corresponding bit positions of each of the registers 22a,b are the inputs of eleven XOR gates, collectively depicted at gate 23. The eleven outputs of gate 23 are the gray code representation of the starting binary row address. Those outputs are loaded into the row portion of an address register 24; specifically, the outputs are stored in the lower bit positions <10:0> of register 24. Concurrently, the same procedure occurs for the starting binary column address using converter 25b and the corresponding gray code equivalent portion is loaded into the upper bit positions <11:21> of register 24, thereby producing a 22-bit starting gray code address.

In accordance with the invention, the storage controller 20 also generates parity bits associated with the starting gray code address. As embodied herein, this function is provided by parity generators 27a,b. The 11-bit output of gate 23 is also coupled to a set of XOR gates collectively shown at gate 28 in parity generator 27a. The gate 28 is configured to provide a single parity bit output for the row address portion. Parity generator 27b is similarly configured to produce a parity bit for the column address portion. The row and column parity bits are stored in a register 26. Thereafter, the storage controller transmits the contents of parity register 26 on line 48, together with the contents of address register 24 on line 44, via bus drivers 45b,a to the address path unit 30.

Figure 3:
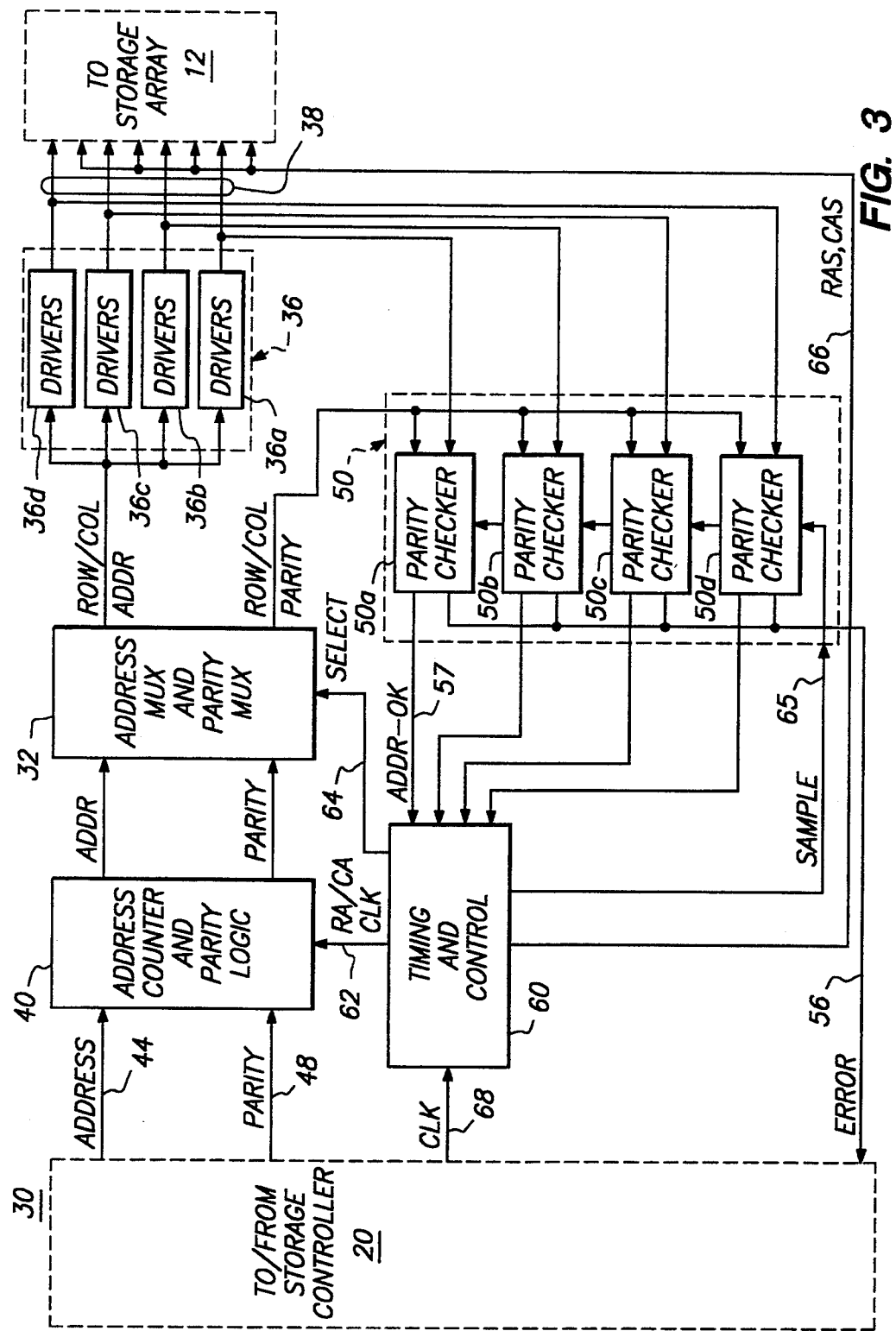
FIG. 3 is a diagram of an address path of an array module used in the subsystem of FIG. 1.

Refer now to FIG. 3. Address path unit 30 generates an address sequence for accessing words of a block of data in the array 12; that is, the block of data comprising, for example, three hundred and twenty (320) 15-bit words is accessed by a series of page mode cycles. A page mode cycle consists of a row address portion followed by an initial column address portion applied to the array 12. Once a data, i.e. read or write, operation is completed at that address, the column address portion is successively incremented a predetermined number of times, e.g. ten (10). Immediately after each address increment, a data operation is executed at the new address. Additionally, the address path unit 30 checks for errors in each address presented to the array 12 and protects against data corruption in the array 12 by suppressing write operations if an address error is detected.

Figure 4:
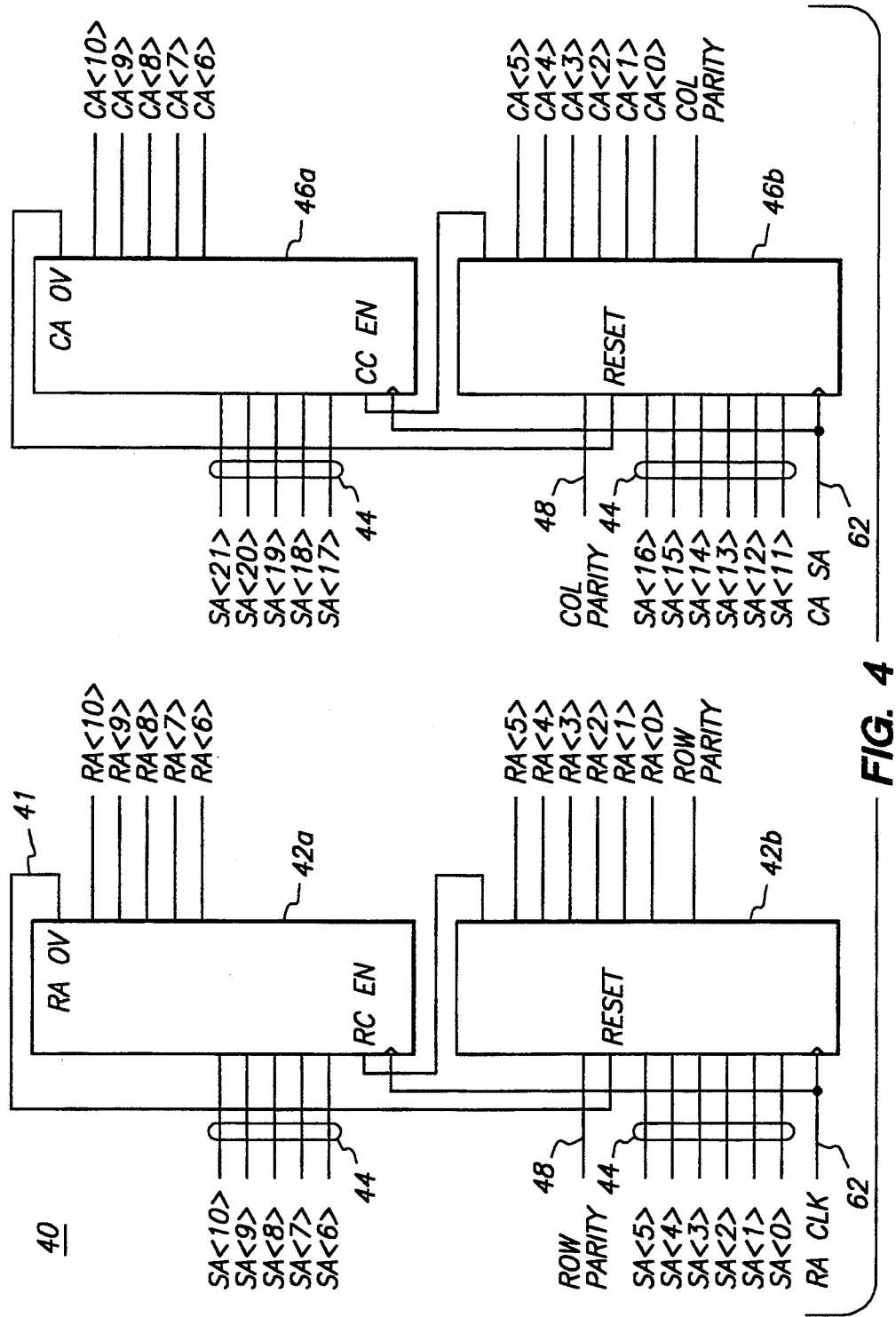
FIG. 4 is a diagram of gray code counters located in the address path of FIG. 3.

More specifically, an address counter and parity logic unit 40 receives from the storage controller 20 the starting gray code address on line 44 and associated parity information on line 48. The logic unit 40 includes means for incrementing the starting gray code address received from the storage controller 20. As embodied herein, such means may include row and column address counters 42 and 46, respectively, shown in FIG. 4. Address counter 42 receives the least significant gray code address bits of a starting location for a block of data, i.e. SA<10:0>, on line 44 and generates the row address portion RA<10:0> of the starting and successive storage locations for a block of data in array 12. Likewise, address counter 46 receives the most significant gray code address bits of the starting location, i.e. SA<21:11>, on line 44 and generates the column address portion CA<10:0>. The counters are similar in structure and function; accordingly, the following description of row address counter 42 applies equally to column address counter 46.

Row address counter 42 consists of two (2) cascaded 6-bit gray code counters 42a,b whose internal flip-flops cycle through a sequence of states as specified in Table 1.

TABLE 1

| Binary | Gray code | Parity |
|---|---|---|
| 00000000000 | 00000000000 | 1 |
| 00000000001 | 00000000001 | 0 |
| 00000000010 | 00000000011 | 1 |
| 00000000011 | 00000000010 | 0 |
| 00000000100 | 00000000110 | 1 |
| 00000000101 | 00000000111 | 0 |
| 00000000110 | 00000000101 | 1 |
| 00000000111 | 00000000100 | 0 |
| 00000001000 | 00000001100 | 1 |
| 00000001001 | 00000001101 | 0 |

An 11-bit starting gray code address is applied to input terminals SA<5:0> of counter 42b and input terminals SA<10:6> of counter 42a. When clocked by the signal RA CLK on line 62 received from the timing and control unit 60, the starting address at the inputs appear unchanged at the outputs of the counters. However, the more significant row counter 42a detects a 5-bit full count and generates an overflow signal RA OV. The overflow signal RA OV connects to a reset input of the counter 42b on line 41 to generate a repeating 11-bit gray code count pattern equivalent to a successively incremented starting row address when clocked again by the RA CLK signal. In a preferred embodiment of the invention, the RA CLK signal on line 62 occurs once per page mode cycle, while the CA CLK signal on line 62 occurs ten times per page mode cycle.

The address counter and parity logic unit 40 also includes means for generating parity information associated with the incremented address. An internal storage element of counter 42b, such as a flip-flop, functions as a parity generator for successive addresses generated by the counter 42. Initially, the row parity bit received from the storage controller 20 is loaded into the flip-flop on line 48. Thereafter, each time the row counter 42 increments, the flip-flop is toggled to generate the associated odd-parity bit as indicated in Table 1.

Referring again to FIG. 3, the address and parity outputs of logic unit 40 are applied to an address and parity multiplexer 32. The state of a SELECT signal on line 64 from the timing and control unit 60 determines whether the multiplexer 32 presents at its output the current row address and associated parity or the current column address and associated parity.

The row/column address output of the multiplexer 32 is applied to the inputs of each of a plurality of storage array drivers 36a-d. The outputs of drivers 36 are directly applied to the array 12 on lines 38 to select particular storage locations in the array; that is, the row/column addresses are fed to the entire array 12 of storage elements unlike prior approaches that address individual banks within an array. The addresses are loaded into registers in the array 12 by row address strobe (RAS) and column address strobe (CAS) control signals on line 66 from timing and control unit 60.

Figure 5:
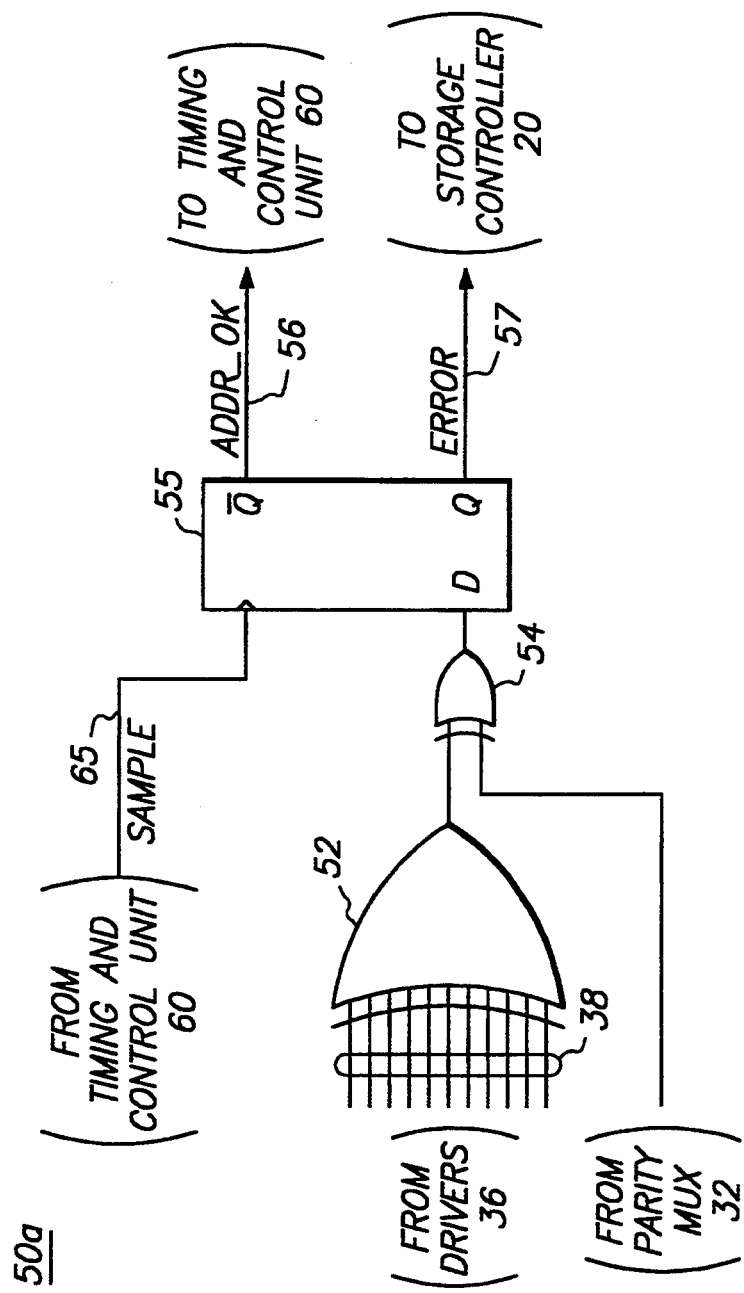
FIG. 5 is a diagram of a parity checker located in the address path of FIG. 3.

The row/column parity output of multiplexer 32 is one of two inputs of a parity checker circuit 50 comprising a plurality of parity checkers 50a-d; the address outputs of drivers 36 are the other inputs. FIG. 5 illustrates an embodiment of parity checker 50a. The outputs of the drivers 36 are applied to a parity generator comprising a set of XOR gates, collectively depicted as a single gate 52. The 1-bit output of gate 52 is the odd-parity bit associated with the address represented by the driver outputs.

An XOR gate 54 compares this parity bit with the parity bit received from the multiplexer 32. The output of the gate 54 indicates whether the two parity bits are the same, i.e. whether or not the address specified by the drivers 36 outputs is correct. This signal is loaded into a D-type flip-flop 55. The $Q_{(not)}$-output of flip-flop 55, i.e. the ADDR_OK signal on line 56, is fed to the timing and control unit 60, while the Q-output, i.e. ERROR signal on line 57, is fed back to the storage controller 20. The flip-flop 55 is clocked by a SAMPLE signal from the timing and control unit 60 on line 65.

Figure 6:
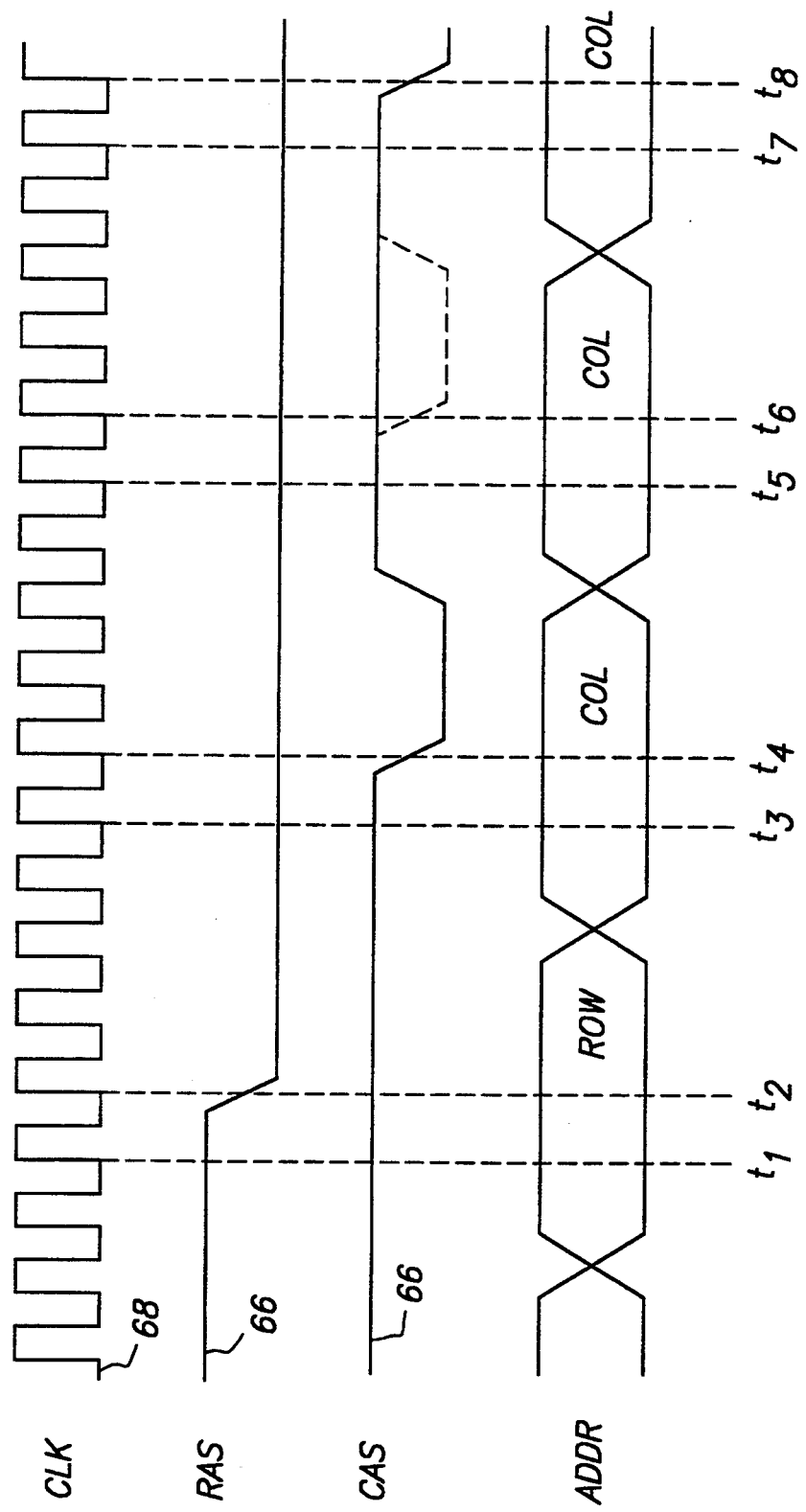
FIG. 6 is timing diagram of certain signals used in accordance with the address fault detection arrangement of the invention.

The timing and control unit 60 (FIG. 3) generates RAS and CAS control signals on line 66 to enable proper operation of the storage array 12. These signals are based upon, and synchronized to, a CLK signal received on line 68 from the controller 20. FIG. 6 is a timing diagram illustrating the interaction of the CLK, RAS, CAS and ADDR signals during a write operation.

The address verification and write operation suppression arrangement in accordance with the invention will now be described with reference to FIGS. 3, 5 and 6. The parity checker 50a verifies the current address as accurate if the output of XOR gate 54 is low or non-asserted. At time $t_1$, i.e. one CLK cycle prior to the assertion of RAS, the SAMPLE signal on line 65 is applied to the flip-flop 55. If the ADDR_OK signal on line 56 is then asserted indicating that the address has been verified, the RAS signal at time $t_2$ is passed to the array 12, enabling the row portion of the current address to be loaded into an appropriate row address register (not shown) in the array 12.

Similarly at time $t_3$, i.e. one CLK cycle prior to the assertion of CAS, the SAMPLE signal on line 65 is again applied to the flip-flop 55. If the parity bits are equal, the resulting ADDR_OK signal on line 56 enables the assertion of the CAS signal at time $t_4$. This in turn enables the column portion of the current address to be loaded into an appropriate column address register (not shown) in the array 12.

The parity checker 50a also provides for suppression of a write operation associated with the current address if an error is detected in the address. For example, at time $t_5$, the SAMPLE signal is provided to the flip-flop 55. If the parity bits are not equal, the output of XOR gate 54 is high or asserted. The ADDR_OK signal on line 56 is thus low, indicating an address error. The timing and control unit 60, upon not receiving the asserted ADDR_OK signal, does not assert CAS at time $t_6$. Accordingly, the column address register in array 12 is not loaded with the column portion of the current address and the write cycle is suppressed, thereby preventing the corruption of data stored at the erroneous address.

At the same time, the flip-flop 55 asserts the ERROR signal on line 57, indicating an address error to the storage controller 20. The controller 20 then reissues the read/write operation and the process repeats.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method for increasing the reliability of data stored in an array of a storage subsystem, said storage subsystem including a storage controller coupled to said array by way of an address path unit, said storage controller configured to receive a binary address identifying the starting address for accessing words of a block of data during execution of page mode cycle data operations, said method comprising the steps of:

generating initial parity information associated with said starting address at said storage controller;

transmitting said starting address and associated parity information to said address path unit;

generating parity information associated with said transmitted starting address at said input of said array;

checking said parity information of said address received at said input of said array against said initial parity information prior to executing said page mode cycle data operation to verify said starting address;

incrementing said starting address at said address path unit;

generating parity information associated with said incremented addresses;

presenting said incremented addresses to said input of said array;

regenerating parity information associated with said incremented addresses at said input of said array;

comparing said generated parity information with said regenerated parity information at said input of said array;

suppressing said page mode cycle data operation if an error is detected in response to said step of checking and said step of comparing, said step of suppressing including the generation of address error status information at the address path unit: and transmitting address error status information associated with said starting and incremented addresses from the address path unit to said controller in response to said step of suppressing; and reissuing said page mode cycle data operation at said storage controller in response to said step of transmitting said address error status information.

2. The method of claim 1 further comprising the step of converting said starting binary address to a starting gray code address at said controller.

3. Apparatus for increasing the reliability of data stored in an array of a storage subsystem, said apparatus comprising:

a storage array having a plurality of locations for storing words of a block of data during execution of a page mode cycle operation;

a storage controller including first parity generating means for generating initial parity signals associated with an initial address, said initial address identifying the starting location in said storage array for accessing said block of data;

an address path unit coupled between said storage array and said storage controller, said address path unit including incrementing means, responsive to said initial address, for generating successive addresses that identify the locations in said storage array for accessing said words of said block of data during execution of said page mode cycle operation, said address path unit further including:

second parity generating means for generating parity information associated with said successive addresses;

parity regenerating means, responsive to said incrementing means, for regenerating parity information associated with said successive address;

comparing means, responsive to said second parity generating means and said parity regenerating means, for comparing said generated and regenerated parity information associated with said successive addresses to verify accuracy of said successive addresses; and suppressing means, responsive to said comparing means, for suppressing said page mode cycle data operation if any of said successive addresses is inaccurate.

4. The apparatus of claim 3 wherein said storage controller further comprises converting means for converting a binary address to said initial address.

5. The apparatus of claim 4 wherein said address path unit further comprises timing and control means for generating control signals to enable storing of said words of said block of data during execution of said page mode cycle data operation.

6. The apparatus of claim 5 wherein said suppressing means comprises a parity check circuit and logic element configuration coupled to said timing and control means, said configuration configured to generate an error status signal in response to an address error in any of said successive addresses.

7. The apparatus of claim 6 wherein said plurality of locations in said storage array are accessed by loading said initial and successive addresses into said array in accordance with said control signals generated by said timing and control means.

8. The apparatus of claim 7 wherein said control signals are not generated when said error status signal indicates said address error, thereby preventing loading of one of said initial and successive addresses into said array and suppressing said page mode cycle operation.

* * * * *